United States Patent [19]

Oota et al.

[11] 4,418,614
[45] Dec. 6, 1983

[54] CONTROL DEVICE FOR COFFEE EXTRACTOR

[75] Inventors: Hiroyuki Oota, Iwakura; Ryuuho Narita, Nagoya, both of Japan

[73] Assignee: Tokyo Shibaura Denki Kabushiki Kaisha, Kawasaki, Japan

[21] Appl. No.: 340,251

[22] Filed: Jan. 18, 1982

[30] Foreign Application Priority Data

Jan. 19, 1981 [JP] Japan .............................. 56-5926[U]
Jan. 23, 1981 [JP] Japan .................................... 56-9430

[51] Int. Cl.$^3$ ........................................... A47J 31/00
[52] U.S. Cl. ...................................... 99/280; 99/285; 99/306; 219/328
[58] Field of Search .................. 99/280, 281, 282, 284, 99/285, 288, 298, 300, 304, 307, 306, 326, 331, 283; 307/141.4, 141.8; 318/484; 219/297, 302, 328, 327, 303, 296

[56] References Cited

U.S. PATENT DOCUMENTS

| | | | |
|---|---|---|---|
| 2,868,109 | 1/1959 | Davis | 99/286 |
| 4,133,256 | 1/1979 | Lamour | 99/280 |
| 4,196,658 | 4/1980 | Takagi | 99/286 |
| 4,223,379 | 9/1980 | Simcoe | 307/141.4 |
| 4,242,568 | 12/1980 | Wunderlin | 99/280 |
| 4,328,539 | 5/1982 | Heeger | 307/141.4 |

FOREIGN PATENT DOCUMENTS 55-163924 11/1980 Japan .

*Primary Examiner*—Robert W. Jenkins
*Attorney, Agent, or Firm*—Cushman, Darby & Cushman

[57] ABSTRACT

A drip mechanism of a coffee extractor has a heater which boils water to be poured on coffee powder and a control switch which controls the ON/OFF operation of the heater. The control device of this drip mechanism has first and second discriminating circuits, so that the ON/OFF operation of the control switch is controlled by an output of a drive circuit controlled by output signals of these discriminating circuits. A predetermined amount of coffee powder is stored in a case. Subsequently, when a regular drip switch and a start switch are depressed, the heater is heated in a first mode so that regular coffee is extracted. When the strong drip switch and the start switch are depressed, the heater is heated in a second mode so that strong coffee is extracted. In order to accomplish this selective operation, a logic circuit is arranged to control the first and second discriminating circuits.

5 Claims, 8 Drawing Figures

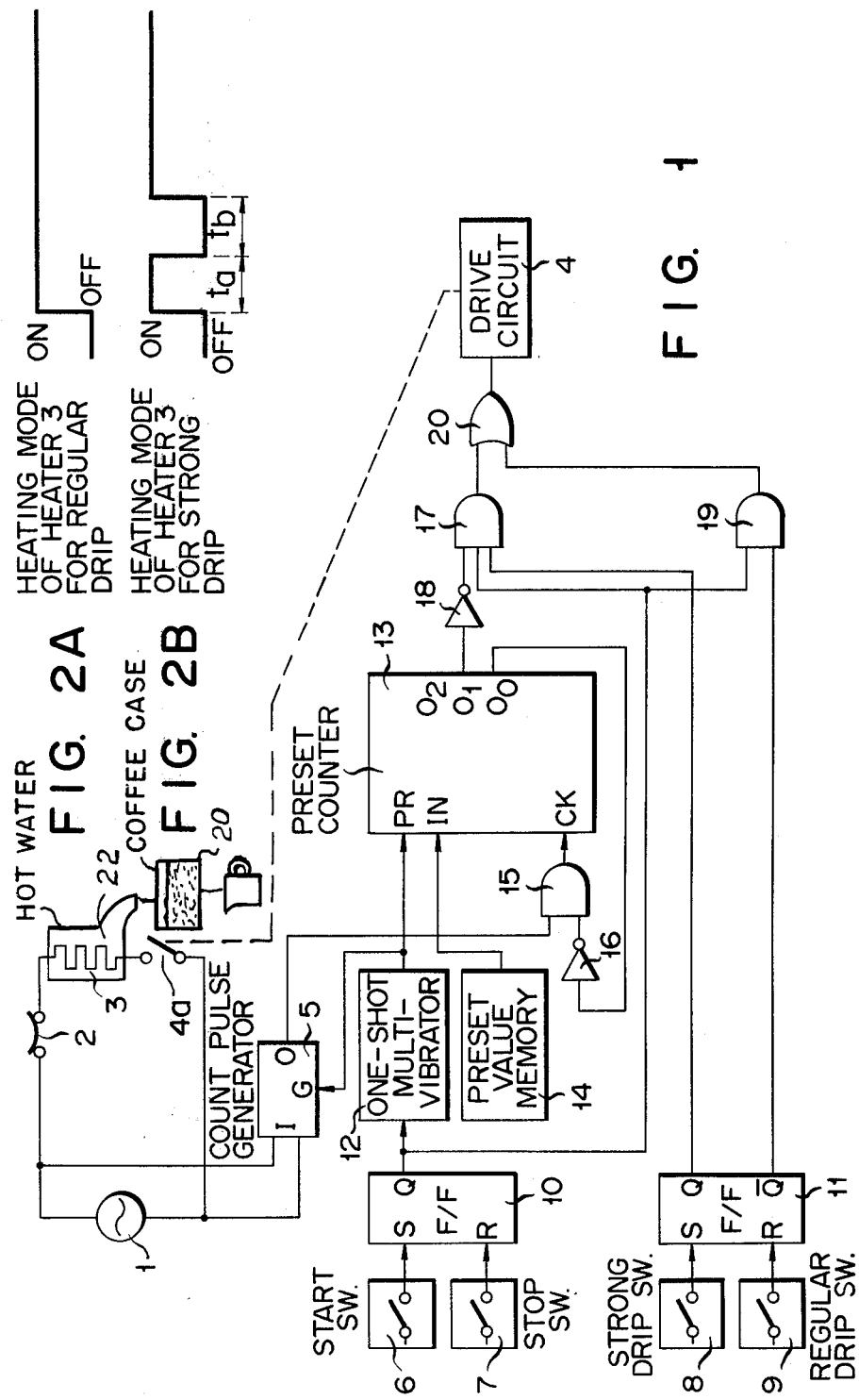

CONTROL DEVICE FOR COFFEE EXTRACTOR

BACKGROUND OF THE INVENTION

The present invention relates to a control device for a coffee extractor in which hot water boiled by an electric heater which constitutes a drip mechanism is supplied to a case in which coffee powder is stored so that coffee is extracted as needed.

It is desirable that a coffee extractor drips a coffee of general concentration (to be referred to as "regular coffee" hereinafter) and a coffee of high concentration (to be referred to as "strong coffee" hereinafter). In a conventional coffee extractor, when strong coffee is to be dripped, much coffee powder is stored in a coffee storage case as compared with the extraction of regular coffee. In this manner, the consumption of coffee powder increases when the strong coffee is to be dripped. Therefore, it is desirable that a coffee extractor drips strong coffee and regular coffee as needed using the same amount of coffee powder.

SUMMARY OF THE INVENTION

It is an object of the present invention, therefore, to provide a control device of a coffee extractor which selectively drips regular and strong coffee using the same amount of coffee powder stored in a case.

In order to achieve the above and other objects of the present invention, there is provided a control device for a coffee extractor having a series circuit, connected between output terminals of a power source and including an electric heater for boiling water and a control switch for controlling the ON/OFF operation of the electric heater; and a drip mechanism which drips coffee by supplying hot water to a case which stores coffee powder. The control device comprises a drive circuit which controls the ON/OFF operation of the control switch in response to an ON instruction signal or an OFF instruction signal; a pulse generator which is connected between the output terminals of the power source for generating a count pulse of a predetermined period; a start switch which generates a start signal; a regular drip switch for dripping regular coffee of a first concentration and a strong drip switch for dripping strong coffee of a second concentration; a memory which stores a selectively operated condition data of the regular drip switch and the strong drip switch; a counter which is preset with a first count data when the start switch is operated, and which has a first output terminal producing a first level output only when the counter has a specific second count data by the way in which the preset first count data is counted down by one each time the counter receives the count pulse and a second output terminal producing the first level output only when the counter has a predetermined third count data; a first logic circuit which couples an input side of the counter, the start switch and the count pulse generator with one another; and a second logic circuit which couples an output side of the counter, the drive circuit and the memory with one another; the second logic circuit including first and second discriminating circuits; the first discriminating circuit being controlled to supply the ON instruction signal to the drive circuit if the counter does not retain the specific second count data when the memory circuit stores the operated condition data of the strong drip switch and the start switch is operated, controlled to supply the OFF instruction signal to the drive circuit when the counter becomes to retain the specific second count data, and controlled to supply again the ON instruction signal to the drive circuit when the counter becomes not to retain the specific second count data; and the second discriminating circuit being controlled to supply the ON instruction signal continuously to the drive circuit when the memory circuit stores the operated condition data of the regular drip switch and the start switch is operated.

According to the control device of the present invention, the amount of coffee powder is kept constant. When the regular drip switch is turned on and when the start switch is turned on, the electric heater is continuously heated to drip the regular coffee. Further, when the strong drip switch is turned on and then, the start switch is turned on, the electric heater is turned on for a predetermined first period and the electric heater is turned off for a subsequent predetermined second period so that hot water is absorbed in the coffee powder. Further, when the predetermined second period elapses, the electric heater is continuously heated to drip the strong coffee. The control device according to the present invention may include a clock device. At a current time display of the clock device, operating symbols of the regular drip switch and the strong drip switch are displayed by temporarily interrupting the display of the current time at the clock device.

BRIEF DESCRIPTION OF THE DRAWINGS

FIG. 1 is a block diagram of a control device according to one embodiment of the present invention;

FIGS. 2A and 2B show waveforms for explaining the ON/OFF operation of an electric heater shown in FIG. 1;

DETAILED DESCRIPTION OF THE PREFERRED EMBODIMENTS

Figure 3:
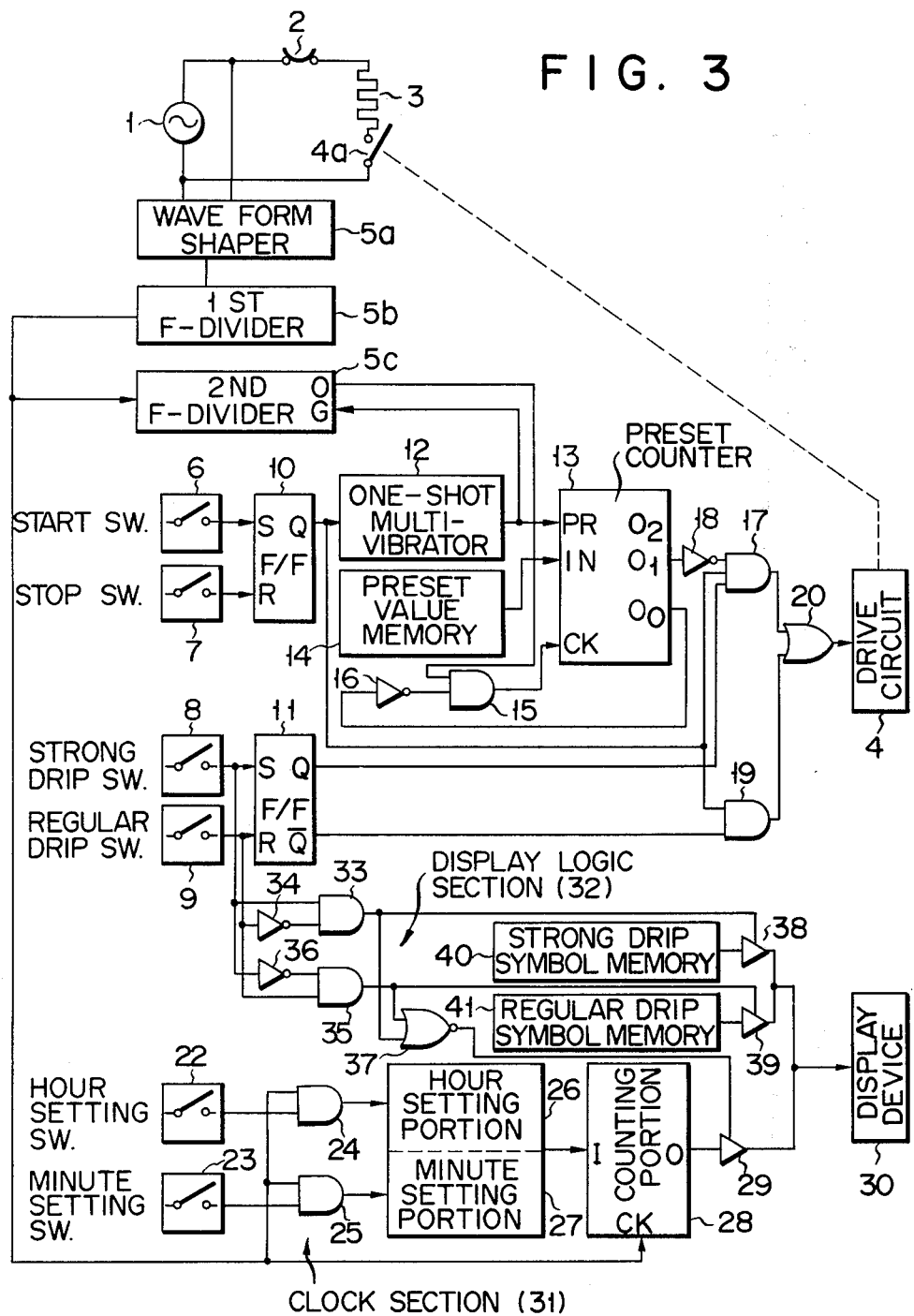
FIG. 3 is a block diagram of a control device according to another embodiment of the present invention.

Referring to FIG. 1, reference numeral 1 denotes a single-phase AC power source of 100 V and 60 Hz. A series circuit comprising a bimetal switch 2, an electric heater 3 and an output switch 4a or a control switch for the heater of a drive circuit 4 to be described later is connected between the output terminals of the single-phase AC power source. In this case, the electric heater 3 belongs to a hot water supply mechanism or a drip mechanism (not shown) of a coffee extractor. With this drip mechanism, water supplied from a water storage tank to a heating device is heated by the heater 3 in line 22. Heater water or hot water is supplied to a case 20 of the coffee extractor which stores coffee powder by utilizing the boiling pressure, so that coffee is dripped. Reference numeral 5 denotes a count pulse generator input terminals I of which are connected to the single-phase AC power source 1. When a signal of high level is supplied to a gate terminal G of the count pulse generator 5, the pulse generating operation is initiated. For example, a signal of high level is produced at every minute from an output terminal O thereof. Reference numeral 6 denotes a start switch. A start signal of high level is produced from the start switch 6 for a period in which the start switch 6 is being depressed. Reference numeral 7 denotes a stop switch. A stop signal of high level is produced from the stop switch 7 only for a period in which the stop switch 7 is being depressed. Reference numeral 8 denotes a strong drip switch which produces a strong drip selection signal of high level only during the depression period of the switch. Reference numeral 9 denotes a regular drip switch which is turned on only when regular coffee is to be dripped. A regular drip selection signal of high level is produced from the regular drip switch 9 only for a period in which the regular drip switch 9 is being depressed. Reference numerals 10 and 11 denote RS flip-flops which function as memories, respectively. The start signal is supplied from the start switch 6 to a set input terminal S of the flip-flop 10. The stop signal is supplied from the stop switch 7 to a reset input terminal R of the flip-flop 10. The strong drip selection signal is supplied from the strong drip switch 8 to a set input terminal S of the flip-flop 11. Further, a regular drip selection signal is supplied from the regular drip switch 9 to a reset input terminal R of the flip-flop 11. An output signal from a set output terminal Q of the flip-flop 10 is supplied to a one-shot multivibrator 12. When the one-shot multivibrator 12 receives the set output signal of high level from the flip-flop 10, the one-shot multivibrator 12 is triggered at a leading edge of the set output signal and produces an output pulse of high level from an output terminal. This pulse signal is supplied to the gate terminal G of the count pulse generator 5 and a preset input terminal PR of a counter 13 of the preset type. An output signal which indicates the count data (first count data) of a preset value memory 14, for example, "2" is supplied to an input terminal IN of the counter 13. To a clock signal input terminal CK thereof is supplied an output signal of an AND circuit 15 which receives the count pulse from the count pulse generator 5 at its first input terminal. When the output pulse signal of the one-shot multivibrator 12 is supplied to the preset input terminal PR of the counter 13, the first count data "2" of the preset value memory 14 is preset therein as an initial set data. Every time the count pulse is supplied to the clock signal input terminal CK, the counter 13 performs a decremental count operation. The counter 13 produces an output signal of high level from an output terminal $O_2$ while the counter 13 retains the first count data "2". When the count data of the counter 13 becomes a specific value (second count data), that is, "1", the counter 13 produces an high level output signal from an first output terminal $O_1$. However, when the count data of the counter becomes a predetermined value (third count data), that is, "0", the counter 13 produces an high level output signal from an second output terminal $O_0$. The high level output signal from the second output terminal $O_0$ is supplied to a second input terminal of the AND circuit 15 through an inverter 16. Reference numeral 17 denotes an AND circuit which functions as a first discriminating circuit. The output signal from the first output terminal $O_1$ of the counter 13 is supplied to a first input terminal of the AND circuit 17 through an inverter 18. The set output signal from the set output terminal Q of the flip-flop 10 is supplied to a second input terminal of the AND circuit 17. To a third input terminal of the AND circuit 17 is supplied the set output signal from the set output terminal Q of the flip-flop 11. Reference numeral 19 denotes an AND circuit which functions as a second discriminating circuit. The set output signal from the set output terminal Q of the flip-flop 10 is supplied to a first input terminal of the AND circuit 19. A reset output signal from a reset output terminal $\overline{Q}$ of the flip-flop 11 is supplied to a second input terminal of the AND circuit 19. Output signals from the AND circuits 17 and 19 are supplied to the drive circuit 4 through an OR circuit 20. The drive circuit 4 has a relay which controls the ON-OFF of the control switch 4a. When an ON instruction signal of high level is supplied from the OR circuit 20, the relay is rendered conductive so that the control switch 4a is turned on. However, when a stop instruction signal of low level is supplied from the OR circuit 20 to the drive circuit 4, the relay is turned off so that the control switch 4a is turned off.

The mode of operation of the control device of the embodiment described above will be described. When coffee of a desired amount is to be extracted, water whose volume corresponds to the number of persons is poured into the water storage tank (not shown) of the drip mechanism. Also, coffee powder whose amount corresponds to the volume of water is stored in the case of the coffee extractor, and a bottle which stores coffee is placed on the heating device of the drip mechanism.

The operation for dripping regular coffee will be described first. When the regular drip switch 9 is depressed, the regular drip switch 9 is turned on so that it supplies the regular drip selection signal to the reset input terminal R of the flip-flop 11. The flip-flop 11 is kept in the reset state so that the reset output signal of high level is produced from the reset output terminal $\overline{Q}$. Therefore, the flip-flop 11 stores a data designating that the regular coffee drip is selected. Subsequently, when the start switch 6 is depressed, the start signal of high level is supplied to the set input terminal S of the flip-flop 10. The flip-flop 10 is kept in the set state so that the set output signal of high level is produced from the set output terminal Q thereof. Therefore, data designating the depression of the start switch 6 is stored therein. The set output signal of high level from the flip-flop 10 and the reset output signal of high level from the flip-flop 11 are supplied to the AND circuit 19. In response to the reception of these signals, the AND circuit 19 supplies the output signal of high level to the drive circuit 4 as the ON instruction signal through the OR circuit 20. The drive circuit 4 continuously energizes the relay so that the control switch 4a is continuously turned on, as shown in FIG. 2A. Therefore, power is supplied to the electric heater 3 through the bimetal switch 2 and the control switch 4a. Water is supplied from the water storage tank to the heating device in which water is heated by the electric heater 3. In this manner, boiled water is supplied to the case by the boiling pressure, so that a coffee is extracted which is, in turn, stored in the bottle placed on the heating device. When the electric heater 3 is continuously heated in accordance with the regular drip pattern as shown in FIG. 2A and hot water is continuously supplied to the case, the coffee of general concentration (first concentration), that is, regular coffee is obtained. Thereafter, when water in the water storage tank of the drip mechanism is completely consumed, heat exchange between the heating device and water ends, so that the temperature of the heating device abruptly rises. In this condition, the bimetal switch 2 is turned off, completing the dripping of regular coffee. Subsequently, the bimetal switch 2 is intermittently turned on or turned off, so that the coffee is kept at a constant temperature. However, when this operation is to be interrupted, the stop switch 7 is depressed. When the stop switch 7 is turned on the stop signal of high level is supplied to the reset input terminal R of the flip-flop 10. The flip-flop 10 is inverted to the reset state so that the set output signal of low level is produced from the set output terminal Q. Thus, the stored data designating the depression of the start switch 6 is erased. Thus, one of the input signals of the AND circuit 19 has low level, so that the AND circuit 19 produces a low level signal. The low level signal is supplied to the drive circuit 4 as the stop instruction signal through the OR circuit 20. Therefore, the drive circuit 4 deenergizes the relay to turn off the control switch 4a.

The operation for dripping strong coffee will now be described. When the strong drip switch 8 is depressed, it supplies the strong drip selection signal of high level to the set input terminal S of the flip-flop 11. The flip-flop 11 is inverted to the set state so that the set output signal of high level is produced from the set output terminal Q. Data denoting the depression of the strong drip switch 8 is thus stored in the flip-flop 11. Subsequently, when the start switch 6 is depressed, the flip-flop 10 is inverted to the set state so that the set output signal of high level is produced from the set output terminal Q. The set output signal of the flip-flop 10 is supplied to the one-shot multivibrator 12. The multivibrator 12 generates an output pulse of high level which is supplied to the gate terminal G of the count pulse generator 5 and the preset input terminal PR of the counter 13. In response to the signal described above, the count pulse generator 5 starts to operate and a first count data "2" stored in the preset value memory 14 is preset in the counter 13 as an intial preset value. Therefore, the signal of high level is produced from the output terminal $O_2$ of the counter 13, and the signals of low level are produced from the first and second output terminals $O_1$ and $O_0$ of the counter 13, respectively. The signal of low level from the first output terminal $O_1$ is supplied to the inverter 18 to invert it to high level. As a result, the AND circuit 17 which receives the output signal of high level from the inverter 18, the set output signal of high level from the flip-flop 10 and the set output signal of high level from the flip-flop 11 produces a signal of high level. This high level signal is supplied to the drive circuit 4 as the ON instruction signal through the OR circuit 20. Then, the drive circuit 4 energizes the relay so that the control switch 4a is correspondingly turned on. Power is then supplied to the electric heater 3 and the drip mechanism supplies hot water to the case in the same manner as described above. Thereafter, when a predetermined time ta (for example, 1 minute) elapses, the count pulse generator 5 generates one output pulse signal of high level since it generates one output pulse per minute. Therefore, the AND circuit 15 supplies a high level signal to the clock signal input terminal CK of the counter 13, so that the counter 13 decrements the preset value or the first count data "2" by "1". As a result, the count data of the counter 13 becomes the specific second count data "1". Therefore, the output signal of high level is produced from the first output terminal $O_1$ of the counter 13 so that the output signal from the inverter 18 becomes low level. As one of the input signals of the AND circuit 17 becomes low level, the AND circuit 17 produces an output signal of low level. This signal of low level is supplied to the drive circuit 4 as the OFF instruction signal through the OR circuit 20 and the control switch 4a is turned off as shown in FIG. 2B. Therefore, the drip mechanism stops its drip operation. Hot water which is supplied to the case by energizing the electric heater 3 for a predetermined time ta (for example, 1 minute) is absorbed in the coffee powder to dampen it. Therefore, the extraction of ingredient of coffee is accelerated. Thereafter, when a predetermined time tb (for example, 1 minute) which corresponds to a period of the count pulse, the count pulse generator 5 further generates one output pulse signal of high level. This pulse signal is supplied to the clock signal input terminal CK of the counter 13 through the AND circuit 15, so that the counter 13 decrements the specific second count data "1" by "1". Therefore, the count data of the counter 13 becomes a predetermined third count data "0", and a high level signal is produced from the second output terminal $O_0$ of the counter 13. As a result, the output signal from the first output terminal $O_1$ of the counter 13 becomes low level and the output signal of the inverter 18 becomes high level. In this manner, the AND circuit 17 produces an output signal of high level again. This output signal is supplied to the drive circuit 4 as the ON instruction signal through the OR circuit 20, so that the control switch 4a is turned on again, as shown in FIG. 2B and the electric heater 3 is energized again. Therefore, the drip mechanism supplies hot water to the case. On the other hand, when the output signal from the second output terminal $O_0$ of the counter 13 has high level, the output signal from the inverter 16 becomes low level. Even if the count pulse generator 5 produces the output pulse signal of high level, this signal is not supplied to the clock signal input terminal CK of the counter 13. Therefore, the count data of the counter 13 is maintained at the predetermined third count data "0". In other words, the counter 13 stops counting. Thereafter, the AND circuit 17 continuously produces the signal of high level and this signal is supplied to the drive circuit 4. The control switch 4a is continuously turned on so that hot water is continuously supplied from the drip mechanism and extraction of coffee is performed. The subsequent process is the same as the process obtaining the regular coffee. In this manner, the ON/OFF of the control switch 4a is controlled in accordance with the strong drip pattern as shown in FIG. 2B and the overall coffee powder is dampened with hot water in order to accelerate the extraction of ingredient of coffee. Thereafter, the extraction is performed for strong coffee whose concentration is higher than that of the regular coffee.

As described above, when the regular drip switch 9 is depressed and thereafter the start switch is depressed the flip-flop 10 is kept in the set state in order to initiate the dripping operation. Therefore, the initial preset value "2" is preset in the counter 13 and the counter 13 starts counting. However, when the strong drip switch 8 is depressed before the predetermined time ta (for example, 1 minute) elapses after the regular drip switch 9 is depressed, the flip-flop 11 is inverted to the set state and the set output signal of high level from the set output terminal Q is supplied to the AND circuit 17. Therefore, the control state of the drive circuit 4 is changed to be controlled by the counting operation of the counter 13. As a result, even in this case, the strong coffee is obtained. Further, when the strong drip switch 8 is depressed after the predetermined time ta elapses and before the predetermined time tb (for example, 1 minute) elapses, the mode of operation of the drive circuit 4 is changed to be controlled by the counting operation of the counter 13. In this case, the count data of the counter 13 is already set to the specific second count data "1" so that the control switch 4a is immediately turned off and hot water supply is stopped. And, when the pedetermined time tb elapses, the count data of the counter 13 becomes "0" (the predetermined third count data) so that hot water supply is initiated again. In this case, hot water supply is stopped only for part of the period of time tb. In this case, the concentration of the extracted coffee is similar to that of the strong coffee. Next, the case occurs in which the strong drip switch 8 is depressed after the predetermined time periods ta and tb elapse since the regular drip switch 9 is depressed. In this case, the counting operation of the counter 13 is already stopped and the count data of the counter 13 is set to "0". Therefore, hot water is continuously supplied in the case. In this case, the regular coffee is obtained.

As described above, when the count data of the counter 13 becomes "0", the output signal from the second output terminal $O_0$ thereof is supplied to the AND circuit 15 through the inverter 16 so that the counting operation of the counter 13 is stopped. The above mode of operation is based on the following reason. In the strong coffee extraction, when the counting operation of the counter 13 continues by receiving the pulse signal at the clock signal input terminal CK even after the count data of the counter 13 is set to "0", an output signal of high level appears on the first output terminal $O_1$ with a certain interval in accordance with the cycle of the counting capacity of the counter 13 so that within the continuous supply time period of hot water after the elapse of constant time tb, there occurs a time period in which the supply of hot water is again stopped. Therefore, when the counting operation of the counter 13 is stopped when the count data thereof is set to "0", the above problem is solved.

Further, as described above, the coffee extractor has an arrangement in which the flip-flop 10 is kept in the set state when the start switch 6 is depressed and the data designating the depression of the start switch 6 is stored therein. The above arrangement is based on the following reason. In the extraction of strong coffee, the one-shot multivibrator 12 is triggered directly in response to the start signal of the start switch 6. In this case, the output pulse from the one-shot multivibrator 12 makes the counter 13 preset the initial preset value "2". If the start switch 6 is erroneously depressed again after the initial preset value "2" is already preset, another preset value "2" will be additionary present, resulting in that the initial preset value becomes "4". Therefore, the strong drip pattern is not accomplished in which hot water is supplied for the predetermined period of time ta (for example, 1 minute) and the supply of hot water is stopped for the perdetermined period of time tb (for example, 1 minute) as shown in FIG. 2B. With the arrangement in which the signal generated upon the first depression of the start switch 6 is stored in the flip-flop 10, the subsequent depression of the start switch 6 becomes invalid, so that the strong drip pattern as shown in FIG. 2B is accurately realized.

The control circuit section except the drive circuit 4 in the above embodiment may comprises a microcomputer.

A control device for a coffee extractor according to another embodiment of the present invention will be described with reference to FIG. 3. In this embodiment, a clock section having a display device which usually displays the current time is additionally arranged in the control device of the first embodiment as shown in FIG. 1. This clock section further displays symbol "L" during the regular drip process and symbol "d" during the strong drip process instead of displaying the current time. The same reference numerals as in FIG. 1 denote the same parts in FIG. 3, and the detailed description thereof will be omitted. In the second embodiment, the count pulse generator comprises a waveform shaper 5a, for example, a Schmitt circuit which is connected between the output terminals of the single-phase AC power source 1 and which generates a pulse signal whose frequency is the same as that of the single-phase AC power source voltage by shaping it into a rectangular waveform, a first frequency-divider 5b which divides the frequency of the output pulse of the Schmitt circuit to produce a pulse signal of high level per second, and a second frequency-divider 5c which divides the frequency of the pulse signal of the first frequency-divider 5b to produce a pulse signal per a predetermined period such as 1 minute for supplying to the drip mechanism control circuit.

Figure 4A:
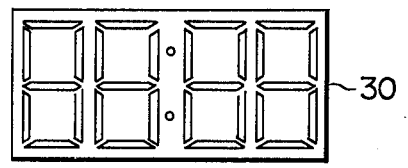
FIG. 4A is a view of a display device shown in FIG. 3.

On the other hand, the clock section 31 is arranged in the following manner. Reference numeral 22 denotes an "hour" setting switch from which an "hour" setting signal of high level is produced only for the period in which the "hour" setting switch 22 is being depressed. Reference numeral 23 denotes a "minute" setting switch from which a "minute" setting signal of high level is produced only for the period in which the "minute" setting switch 23 is being depressed. The "hour" setting signal from the "hour" setting switch 22 is supplied to a first input terminal of an AND circuit 24 and the "minute" setting signal from the "minute" setting switch 23 is supplied to a first input terminal of an AND circuit 25. Second input terminals of the AND circuits 24 and 25 receive the pulse signal of the first frequency-divider 5b. The gate of the second frequency-divider 5c receives the signal which is produced from the one-shot multivibrator 12, and the output signal therefrom is supplied to the first input terminal of the AND circuit 15. Output signals of the AND circuits 24 and 25 are supplied to input terminals of an "hour" setting portion 26 and a "minute" setting portion 27, respectively. Output signals from the "hour" setting portion 26 and the "minute" setting portion 27 are supplied to an input terminal I of a counting portion 28. The output pulse signal of the first frequency-divider 5b is supplied to a clock signal input terminal CK of the counting portion 28. A signal from the output terminal O of the counting portion 28 is supplied to a display device 30 through a transfer gate circuit 29. In this case, the display device 30 comprises a segment type digital display device as shown in FIG. 4A.

Reference numeral 32 denotes a drive section or display logic section of the display device 30, and the detailed description thereof will be described below. The strong drip selection signal from the strong drip switch 8 is supplied to a first input terminal of an AND circuit 33. To a second input terminal of the AND circuit 33 is supplied the regular drip selection signal from the regular drip switch 9 through an inverter 34. The strong drip selection signal from the strong drip switch 8 is supplied to a first input terminal of an AND circuit 35 through an inverter 36. The regular drip selection signal from the regular drip switch 9 is supplied to a second input terminal of the AND circuit 35. The output signal of the AND circuit 33 is supplied to the gate terminal of a transfer gate 38, and the output signal of the AND circuit 35 is supplied to the gate terminal of a transfer gate circuit 39. Reference numeral 40 denotes a strong drip symbol memory which stores symbol "d".

The storage content of the memory 40 is supplied to the input terminal of the display device 30 through the transfer gate circuit 38. Reference numeral 41 denotes a regular drip symbol memory which stores symbol "L". The storage content of the memory 41 is supplied to the display device 30 through the transfer gate circuit 39.

The mode of operation of the control device for the coffee extractor of the second embodiment as shown in FIG. 3 will be described.

Figure 4B:
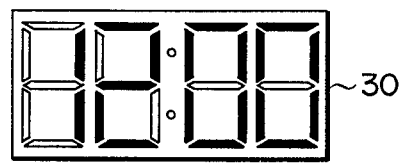
FIGS. 4B to 4D are views illustrating display examples of a display device of FIG. 3.

The mode of operation of the clock display in the clock section 31 will be described first. When the "hour" setting switch 22 is depressed, the "hour" setting signal of high level is supplied to the AND circuit 24. The AND circuit 24 then supplies the output pulse signal of the first frequency-divider 5b to the "hour" setting portion 26. Every time the "hour" setting portion 26 receives this pulse signal, the "hour" setting portion 26 operates to make the counting portion 28 count "hour" such as "1", "2", "3", . . . at its "hour" counting part, so that the count data of the "hour" counting portion 28 sequentially changes. The data of the "hour" counting portion 28 is supplied to the display device 30 through the transfer gate circuit 29. The "hour" data is displayed at an "hour" display part of the display device 30. When the "minute" setting switch 23 is depressed, the "minute" setting signal of high level is supplied to the AND circuit 25. The AND circuit supplies the pulse signal from the first frequency-divider 5b to the "minute" setting portion 27. Every time the "minute" setting portion 27 receives the pulse signal, the "minute" setting portion 27 operates to make the counting portion 28 count "minute" data such as "1", "2", "3", . . . at its "minute" counting part, so that the count data of the counting portion 28 sequentially changes. The data of the "minute" counting part is supplied to the display device 30 through the transfer gate circuit 29. The "minute" data of the counting portion 28 is displayed at a "minute" display part of the display device 30. In this manner, when the current time is set in the counting portion 28, the current time is displayed as "12:00" (twelve o'clock), as shown in FIG. 4B. Subsequently, the counting portion 28 performs the counting operation once per second in response to the pulse signal received from the first frequency-divider 5b at the clock signal input terminal CK. The count data of the counting portion 28 is sequentially displayed at the display device 30. The clock display at the display device 30 changes in units of one minute.

Figure 4C:
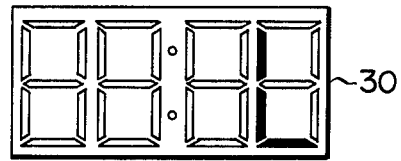

When coffee is extracted, water whose volume corresponds to the total number of persons is poured into the water storage tank of the drip mechanism and coffee powder whose amount corresponds to the volume of the coffee to be extracted is stored in the case of the coffee extractor. Further, the bottle for storing the coffee is placed on the heating device of the drip mechanism in the same manner as in the first embodiment shown in FIG. 1. The arrangement and operation of the drip mechanism control circuit are the same as in the first embodiment shown in FIG. 1, as far as the regular coffee and the strong coffee are selectively extracted. Therefore, the detailed description thereof will be omitted except that the display mode at the display section 30 will be described when the regular drip switch 9 and the strong drip switch 8 are selectively turned on. When the regular drip switch 9 is turned on, the regular drip selection signal of high level is supplied to the AND circuit 35. The signal of low level from the strong drip switch 8 is supplied to the AND circuit 35 through the inverter 36, so that the signal of high level from the AND circuit 35 is supplied to the gate of the transfer gate circuit 39 to render it conductive. On the other hand, when the output signal from the AND circuit 35 becomes high level, the output signal from the NOR circuit 37 becomes low level. Therefore, the transfer gate circuit 29 is rendered nonconductive. The count data of the counting portion 28 is not displayed at the display device 30 and symbol "L" which is read out from the regular drip symbol memory 41 is displayed at the display device 30, as shown in FIG. 4C. When the depression of the regular drip switch 9 is thereafter released, the transfer gate circuit 39 is rendered nonconductive and the transfer gate circuit 29 is rendered conductive. The clock display is performed at the display device 30, based on the count data of the counting portion 28. Subsequently, when the start switch 6 is depressed, the regular coffee is obtaind as described with reference to FIG. 1. In order to stop the operation for heating the regular coffee at constant temperature, as described above, the stop switch 7 is turned on.

Figure 4D:
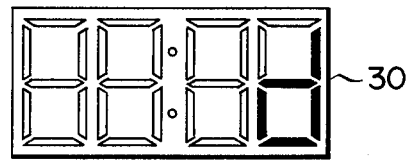

A case is described in which the strong drip switch 8 is selectively turned on. When the strong drip switch 8 is turned on, the strong drip selection signal of high level is supplied to the AND circuit 33. In this case, the output signal of the inverter 34 becomes high level (the regular drip selection signal is not produced from the regular drip switch 9), so that the output signal of high level of the AND circuit 33 renders the transfer gate circuit 38 conductive. Symbol "d" read out from the strong drip symbol memory 40 is displayed at the display device 30 (as shown in FIG. 4D). Further when the output signal from the AND circuit 33 becomes high level, the output signal from the NOR circuit 37 becomes low level, so that the transfer gate circuit 29 is rendered nonconductive. Therefore, the clock data of the counting portion 28 is not displayed at the display device 30. Thereafter, when the depression of the strong drip switch 8 is released, the strong drip selection signal is not produced from the strong drip switch 8, so that the transfer gate circuit 38 is rendered nonconductive and the transfer gate circuit 29 is rendered conductive. The current time is displayed at the display device 30 again, based on the count data of the counting portion 28. Subsequently, when the start switch 6 is turned on, the strong coffee is obtained in the same manner as described with reference to FIG. 1.

The control device of the second embodiment as shown in FIG. 3 has an arrangement in which the selective operation of the regular drip switch 9 and the strong drip switch 8 is displayed, so that the mode of operation is easily and visually checked. Further, as compared with a case in which display lamps are arranged for the regular and strong drip switches 9 and 8, the arrangement according to the present invention results in low manufacturing cost.

What we claim is:

1. A control device for a coffee extractor having a series circuit, connected between output terminals of a power source and including an electric heater for boiling water and a control switch for controlling the ON/OFF operation of said electric heater; and a drip mechanism which drips coffee by supplying hot water to a case which stores coffee powder, wherein said control device comprises:

a drive circuit which controls the ON/OFF operation of said control switch in response to an ON instruction signal or an OFF instruction signal;

a pulse generator which is connected between said output terminals of said power source for generating a count pulse of a predetermined period;

a start switch which generates a start signal;

a regular drip switch for dripping regular coffee of a first concentration and a strong drip switch for dripping strong coffee of a second concentration;

a memory which stores a selectively operated condition data of said regular drip switch and said strong drip switch;

a counter which is preset with a first count data when said start switch is operated, and which has a first output terminal producing a first level output only when said counter has a specific second count data by the way in which said preset first count data is counted down by one each time said counter receives said count pulse and a second output terminal producing said first level output only when said counter has a predetermined third count data;

a first logic circuit which couples an input side of said counter, said start switch and said count pulse generator with one another; and a second logic circuit which couples an output side of said counter, said drive circuit and said memory with one another;

said second logic circuit including first and second discriminating circuits;

said first discriminating circuit being controlled to supply said ON instruction signal to said drive circuit if said counter does not retain said specific second count data when said memory circuit stores the operated condition data of said strong drip switch and said start switch is operated, controlled to supply said OFF instruction signal to said drive circuit when said counter becomes to retain said specific second count data, and conrolled to supply again said ON instruction signal to said drive circuit when said counter becomes not to retain said specific second count data; and said second discriminating circuit being controlled to supply said ON instruction signal continuously to said drive circuit when said memory circuit stores the operated condition data of said regular drip switch and said start switch is operated.

2. A control device according to claim 1, wherein said counter is controlled by said first logic circuit in the manner that said counting down operation of said counter is initiated on the base of said preset first count data, and said counter stops counting operation of said count pulse when the contents of said counter reaches said predetermined third count data.

3. A control device according to claim 1, wherein said first logic circuit includes a set-rest flip-flop circuit which receives the output signal of said start switch at a set terminal, an output signal of a stop switch for stopping coffee extraction at a reset terminal and which supply a set output signal produced when said start switch is operated to a preset terminal of said counter for a predetermined time period.

4. A control device according to claim 1, wherein said pulse generator includes a frequency-divider which frequency-divides an input signal only for a period in which a signal of first level is supplied to the gate terminal thereof;

said first logic circuit includes a set-reset flip-flop circuit, a set terminal which receives the start signal from said start switch and a reset terminal which receives a drip operation stop signal from a stop switch; a one-shot multivibrator which receives a set output signal of said flip-flop circuit and supplies its output signal of first level to a preset terminal of said counter and to a gate terminal of a frequency divider of said pulse generator for a predetermined period of time; a preset value memory which stores data to preset said first count data in said counter when the output of first level is supplied from said one-shot multivibrator; and an AND circuit which receives an output from said frequency divider as a first input and an output signal (output of $O_0$ terminal) of first level as a second input through an inverter when the count contents of said counter reaches said predetermined third count data to stop the count operation of said counter; and said second logic circuit includes an inverter which is connected to said first output terminal of said counter to supply its output to a first input terminal of said first discriminating circuit; and an OR circuit which receives output signals of said first and second discriminating circuits to supply its output signal to said drive circuit;

said first discriminating circuit receiving as its second and third inputs the set output of said flip-flop circuit and the set output of said memory when said strong drip switch is operated; and said second discriminating circuit receiving as its first and second input the set output of said flip-flop circuit and the reset output of said memory when said regular drip switch is operated.

5. A control device according to claim 1, wherein said pulse generator includes a waveform shaper of the single-phase AC power source voltage, a first frequency-divider for frequency-dividing an output frequency of said waveform shaper to produce a first count pulse, and a second frequency-divider for frequency-dividing said first count pulse of said first frequency-divider to produce a second count pulse having said predetermined period;

said control device further includes a clock section having a display device which displays current time by counting said first count pulse and a display logic circuit which is coupled to said clock section, said regular drip switch and said strong drip switch; and said display logic circuit interrupts the display of a current time of said clock section for displaying a symbol or character corresponding to the operating mode of said regular drip switch or said strong drip switch on said display device.

* * * * *